US012686571B2

(12) United States Patent
Sundholm

(10) Patent No.: US 12,686,571 B2
(45) Date of Patent: Jul. 21, 2026

(54) METHOD AND APPARATUS FOR HANDLING MATERIAL IN A PNEUMATIC MATERIAL CONVEYING SYSTEM

(71) Applicant: Maricap Oy, Vantaa (FI)

(72) Inventor: Göran Sundholm, Tuusula (FI)

(73) Assignee: MARICAP OY, Vantaa (FI)

( * ) Notice: Subject to any disclaimer, the term of this patent is extended or adjusted under 35 U.S.C. 154(b) by 227 days.

(21) Appl. No.: 18/700,486

(22) PCT Filed: Nov. 7, 2022

(86) PCT No.: PCT/FI2022/050728
§ 371 (c)(1),
(2) Date: Apr. 11, 2024

(87) PCT Pub. No.: WO2023/084152
PCT Pub. Date: May 19, 2023

(65) Prior Publication Data
US 2024/0409328 A1      Dec. 12, 2024

(30) Foreign Application Priority Data
Nov. 12, 2021    (FI) ..................................... 20216162

(51) Int. Cl.
*B65G 53/24*          (2006.01)
*B30B 9/30*           (2006.01)
(Continued)

(52) U.S. Cl.
CPC ............ *B65G 53/24* (2013.01); *B30B 9/3042* (2013.01); *B30B 15/30* (2013.01); *B65F 9/00* (2013.01); *B65G 53/60* (2013.01); *B65G 53/66* (2013.01)

(58) Field of Classification Search
CPC ....... B30B 15/30; B30B 9/301; B30B 9/3042; B30B 9/3046; B30B 9/3089; B65G 53/24;
(Continued)

(56) References Cited

FOREIGN PATENT DOCUMENTS

| FI | 123410 B | 3/2013 |
| FI | 124098 B | 3/2014 |

(Continued)

OTHER PUBLICATIONS

Extended European search report mailed Aug. 19, 2025 for corresponding Application No. 22892194.6 (7 pages).
(Continued)

*Primary Examiner* — Jimmy T Nguyen
(74) *Attorney, Agent, or Firm* — Carroll, Hoette & Butscher, LLC; Christopher R. Carroll

(57)                ABSTRACT

A method and apparatus for transferring and handling material. Material is supplied into a separator device by a conveying pipe with an air flow from a partial-vacuum generator connected to a container space of the separator device, to a transporting pipe. The material is removed from the container space via an outlet opening to a press chamber. The material is transferred and compacted by a transferring member of a pressing device to a container space of a separate material container removably connected to the pressing device. The efficiency of movement of the material from the separator device container space to the press chamber and the material container is increased by connecting a suction side of the generator to the material container space via a suction pipe and a suction opening and by supplying replacement air to the separator device container space and/or to the press chamber.

17 Claims, 6 Drawing Sheets

(51) Int. Cl.

| | | |
|---|---|---|
| *B30B 15/30* | (2006.01) |
| *B65F 9/00* | (2006.01) |
| *B65G 53/60* | (2006.01) |
| *B65G 53/66* | (2006.01) |

(58) Field of Classification Search

CPC ........ B65G 53/60; B65G 53/66; B65G 53/36; B65G 65/32; B65G 69/20; B65G 53/14; B65G 53/04; B65G 53/12; B65G 53/28; B65G 53/526; B65G 2812/1616; B65F 9/00; B65F 5/00; B65F 5/005; B65F 1/1405

See application file for complete search history.

(56) References Cited

FOREIGN PATENT DOCUMENTS

| JP | 57112994 | A | * | 7/1982 | ........... B30B 9/3057 |
|---|---|---|---|---|---|
| JP | H01 242301 | A | | 9/1989 | |
| JP | H05138077 | A | | 6/1993 | |
| JP | H06100101 | A | | 4/1994 | |
| RU | 2636950 | C2 | | 11/2017 | |
| WO | 2013038057 | A1 | | 3/2013 | |
| WO | 2014037611 | A1 | | 3/2014 | |
| WO | 2014064332 | A1 | | 5/2014 | |
| WO | 2021144497 | A1 | | 7/2021 | |

OTHER PUBLICATIONS

FI Office action for FI20216162 dated Jul. 6, 2022 (6 pages).
FI Office action for FI20216162 dated Sep. 2, 2024 (Approval for acceptance) (6 pages).
FI Search report dated Jul. 6, 2022 (1 pages).
International Search Report dated Sep. 2, 2023 (5 pages).
Written opinion of ISA dated Sep. 2, 2023 (7 pages).
Office Action mailed Feb. 16, 2026 for corresponding Russian Patent Application No. 2024108838. English translation provided.
Search Report in corresponding JP Application No. 202280075463. 7, dated May 19, 2026.
Office Action in corresponding JP Application No. 202280075463. 7, dated May 19, 2026, English translation provided.

* cited by examiner

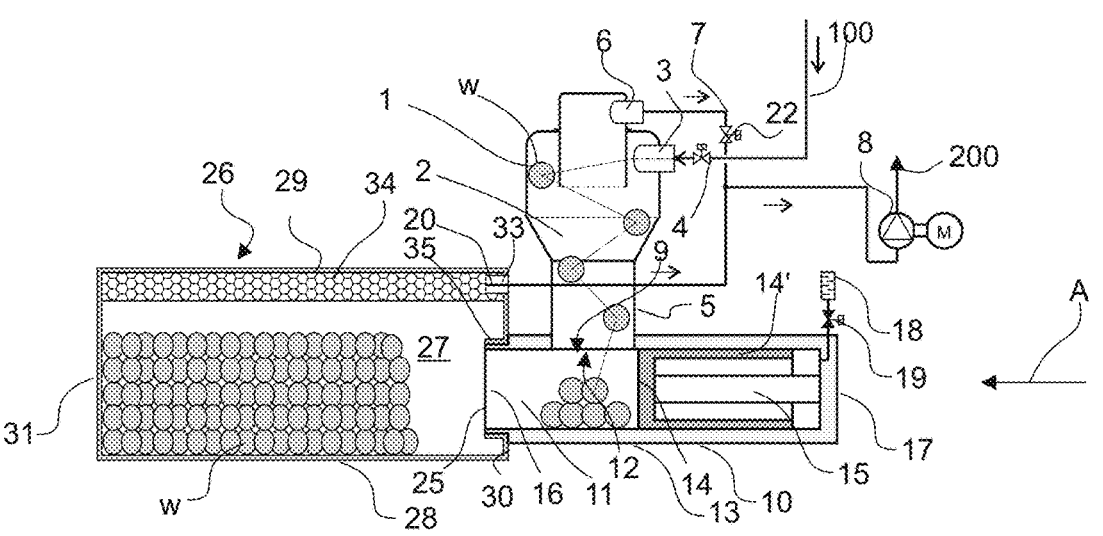
Fig. 12
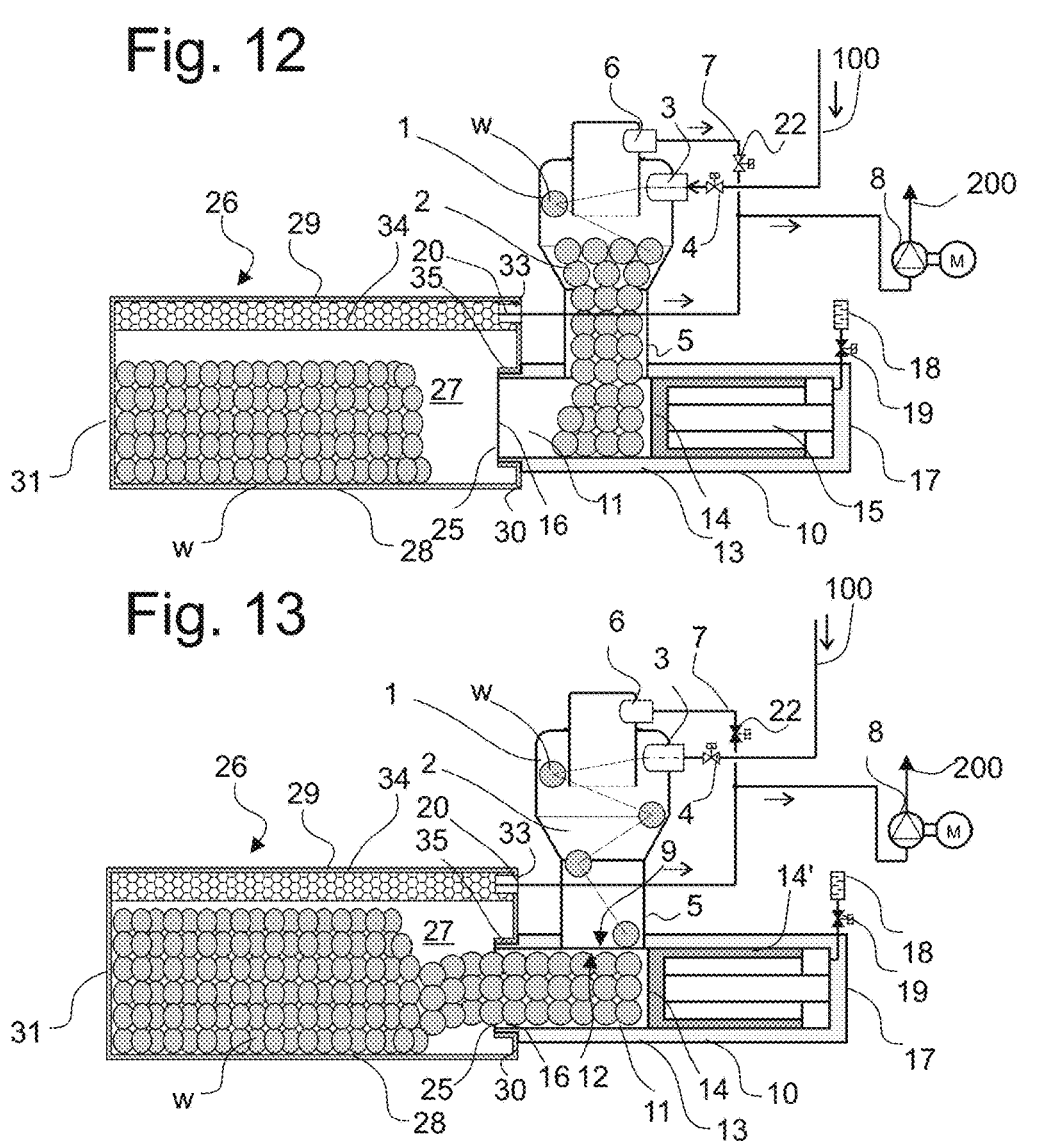
Fig. 13
Fig. 14

METHOD AND APPARATUS FOR HANDLING MATERIAL IN A PNEUMATIC MATERIAL CONVEYING SYSTEM

CROSS-REFERENCE TO RELATED APPLICATIONS

This application is a national phase of, and claims priority to, International Patent Application No. PCT/FI2022/050728 (filed 7 Nov. 2022), which claims priority to Finnish Patent Application No. 20216162 (filed 12 Nov. 2021), the entire disclosures of which are incorporated by reference herein.

BACKGROUND

Field of the Invention

The invention relates generally to pneumatic material conveying systems, such as partial-vacuum transporting systems, specifically to the collection and transfer of material, such as to the transfer of industrial materials or domestic waste or recyclable material.

Description of Related Art

Systems in which waste is conveyed in piping by means of a pressure difference or suction are known. In such systems, the waste may be conveyed over long distances in the piping. It is typical of them that a partial-vacuum apparatus or a blower may be used to provide the pressure difference, in which partial-vacuum apparatus the negative pressure into the conveying pipe is provided by partial-vacuum generators, such as partial-vacuum pumps. The conveying pipe may be provided with at least one valve member, by opening and closing which valve member the replacement air coming in to the conveying pipe may be controlled. In the systems, input points, such as waste chutes, into which the material, such as waste material, is fed may be used at a material input end and the material to be conveyed may be transferred to the conveying pipe for example by opening a discharge valve member. The waste transfer may take place mainly by means of a pressure difference caused by an air flow. The air flow may be provided by sucking air through the piping. Waste material, such as for example waste material packed into bags, may be conveyed from the input point to the conveying pipe and further into a separator device in which the waste is separated from the transporting air. In connection with the separator device there may be a compactor device, such as a transferring member arranged to an actuator, for example to a cylinder-piston combination, by which transferring member the waste may be transferred from a compactor chamber provided in connection with the separator device into a waste container, for example a transportation container. In the known solution, the waste moves by gravity from the separator device into a transferring chamber from which the waste material is transferred and compacted into the waste container by the transferring member of the compactor device. In the known solutions, the capacity is being limited, among other things, by the size of the waste material batch moving at a time from the separator device into the compactor chamber.

The objective of this invention is to provide a completely new solution for a method and an apparatus for transferring and handling material, specifically between a separator device, a compactor device and a waste container, by means of which the drawbacks of the known solutions will be avoided. One objective of the invention is to provide a method and an apparatus the operation of which is reliable, efficient and the relative capacity of which at the site of application is high.

BRIEF SUMMARY OF THE INVENTION

The invention is based on an idea in which efficiency of movement of material from a separator device via a compactor chamber into a material container is increased by using suction provided by a partial-vacuum generator from the direction of a container space of the material container and by supplying replacement air from the direction of a container space of the separator device and/or the compactor chamber to provide a pressure difference, in addition to movement of a transferring member of a compactor device, for transferring the material. The object of the invention is according to one embodiment a method for transferring and handling material, in which method material is supplied into a separator device by a material conveying pipe from an inlet opening together with a transporting air flow provided by a partial-vacuum generator connected by a pipe to a container space of the separator device, to a transporting air outlet pipe, in which method the material is removed from a container space of the separator device via an outlet opening to a press chamber, and wherein material is transferred and compacted by a transferring member of a pressing device via an outlet opening of the press chamber to a container space of a separate material container, which material container is removably connected to the pressing device. In the method, the efficiency of movement of the material from the container space of the separator device to the press chamber and further to the container space of the material container is increased by connecting a suction side of the partial-vacuum generator to act in the container space of the material container via a suction pipe and a suction opening and by supplying replacement air to the container space of the separator device and/or to the press chamber of the press device.

Instead of or in addition to an embodiment as mentioned above or below, the efficiency of movement of the material may be increased by supplying replacement air to the container space of the separator device. Simultaneously, a connection via the transporting air outlet opening of the separator device to the suction side of the partial-vacuum generator may be closed.

Instead of or in addition to an embodiment as mentioned above or below, the efficiency of movement of the material may be increased before a movement of the transferring member of the press device, for transferring and compacting the material from the press chamber to the container space of the material container, from a first position to a second position, and/or during the movement of the transferring member from the first position to the second position.

Instead of or in addition to an embodiment as mentioned above or below, replacement air may be supplied to the container space of the separator device via the material conveying pipe.

Instead of or in addition to an embodiment as mentioned above or below, replacement air may be supplied to the container space of the separator device via an inlet opening. In this case, the connection via the transporting air outlet pipe of the separator device to the suction side of the partial-vacuum generator may have been closed or may be closed.

Instead of or in addition to an embodiment as mentioned above or below, in the method, material may be transferred in a vertical direction from the container space of the separator device to the press chamber. According to one embodiment, in this case material may be transferred in a transverse direction relative to the vertical direction, preferably in a horizontal direction, in the press chamber and from the press chamber to the container space of the material container.

Instead of or in addition to an embodiment as mentioned above or below, in the method, a material container removably connectable to the press device may be used as the material container, to the suction opening in an upper part of which material container the suction pipe is removably connectable. According to one embodiment, the material container may be a waste container which may be configured as a waste container movable by a transportation means.

According to a second aspect, the invention relates to an apparatus for transferring and handling material. The apparatus is characterized by what is mentioned in claim 8. The embodiments of the apparatus are characterized by what is mentioned in the dependent claims.

The apparatus may comprise a separator device, which may have a material space, an inlet pipe, a transporting air outlet pipe and a material outlet opening, to which inlet pipe a material conveying pipe may be connectable for supplying material in a transporting air flow to a container space of the separator device, and wherein the transporting air outlet pipe may be connectable into medium communication with a suction side of a partial-vacuum generator of a pneumatic material conveying system, and wherein the material outlet opening of the separator device may be disposed in medium communication with a press chamber of a press device, which press chamber may have an inlet opening, and an outlet opening, wherein the press chamber may house a movably arranged transferring member, and the transferring member of the press device may be configured to transfer and compact material via the outlet opening of the press chamber to a container space of a separate material container removably connected to the press device. According to one embodiment, the apparatus may comprise means for increasing the efficiency of movement of the material from the container space of the separator device to the press chamber and further to the container space of the material container, which means may comprise connecting means for connecting the suction side of the partial-vacuum generator to act in the container space of the material container by a suction pipe via a suction opening and replacement air supplying means for supplying replacement air to the container space of the separator device and/or to the press chamber of the press device.

Instead of or in addition to an embodiment as mentioned above or below, the replacement air supplying means may comprise, from the material space of the separator device, most suitably from an upper part thereof, a medium connection to a replacement air opening and closing/regulating means for opening and closing the medium connection, and/or an arrangement in which replacement air has been configured to be supplied to the container space of the separator device via the inlet pipe and/or via the transporting air outlet pipe.

Instead of or in addition to an embodiment as mentioned above or below, the replacement air supplying means may comprise a replacement air opening being in medium communication to the press device, to the pressing chamber thereof.

Instead of or in addition to an embodiment as mentioned above or below, the apparatus may comprise first closing/regulating means configured to open a connection for supplying replacement air to the container space of the separator device and second closing/regulating means configured to close a connection from the container space of the separator device via the transporting air outlet opening to the suction side of the partial-vacuum generator.

Instead of or in addition to an embodiment as mentioned above or below, the apparatus may have a first operating state in which the connection from the container space of the separator device via the transporting air outlet pipe to the suction side of the partial-vacuum generator is open and a connection from the inlet pipe of the separator device to the material conveying pipe is open, and from the suction opening of the material container via the suction pipe to the suction side of the partial-vacuum generator open, such that the material is able to move from the conveying pipe to the container space of the separator device and further via the outlet opening to the press chamber.

Instead of or in addition to an embodiment as mentioned above or below, the apparatus may have a second operating state in which the connection from the container space of the separator device via the transporting air outlet pipe to the suction side of the partial-vacuum generator is closed and a replacement air line to the upper part of the separator device is open, and a connection via the suction opening of the material container and via the suction pipe to the suction side of the partial-vacuum generator is open, such that the material may move more efficiently from the container space of the separator device to the press chamber and/or from the press chamber to the container space of the material container.

Instead of or in addition to an embodiment as mentioned above or below, the apparatus may have a third operating state, in which the press member has been configured to be transferred by an actuator from a first position to a second position, for transferring and compacting material (w) from the press chamber to the container space of the material container, in which operating state the connection via the suction opening of the material container and via the suction pipe to the suction side of the partial-vacuum generator is open, and a connection from the press chamber (11) to the press replacement air opening is open, and the connection from the transporting air outlet pipe of the separator device to the suction side of the partial-vacuum generator is open.

Instead of or in addition to an embodiment as mentioned above or below, the apparatus may have a fourth operating state in which the transferring member of the press device is configured to be moved from the second position to the first position, to a standby position.

Instead of or in addition to an embodiment as mentioned above or below, the press device may comprise a closing part by which a connection between the container space of the separator device and the press chamber may be openable and closable, preferably synchronously to movements of the transferring member.

Instead of or in addition to an embodiment as mentioned above or below, the material container may comprise a separator wall, such as a grille or a mesh, between the container space and the suction opening.

The solution according to the invention has a number of significant advantages. By means of the solutions of the invention, drawbacks of the prior art will be avoided. By increasing the efficiency of movement of the material by means of a pressure difference provided by suction and replacement air, a press device may be provided with a considerably larger capacity than before. This has great importance for example in waste presses being used in connection with pneumatic waste conveying systems. The method according to the invention is easily adaptable to pneumatic waste conveying systems. The method and the apparatus according to the invention may be arrangeable to increase the efficiency of new and already existing applications. The solution according to the invention is excellently suitable to boost the capacity of a press device, because more material can be supplied to the operating range of the transferring member of the press than in the known solutions. According to one embodiment, by the solution according to the invention the press device may be provided with up to double the capacity of the prior-art configuration.

Inventive embodiments are also disclosed in the description and the drawings of this application. The inventive content in the application may also be defined otherwise than how it is done in the following claims. The inventive content may also be comprised of several separate inventions, especially if the invention is considered in light of the expressed or implicit subtasks or in terms of the achieved benefits or sets of benefits. In this case, some features of the following claims may be redundant in terms of different inventive ideas. The features of different embodiments of the invention may be applied in connection with other embodiments within the scope of the basic inventive idea.

BRIEF DESCRIPTION OF DRAWINGS

In the following the invention will be described in more detail by way of an example with reference to the accompanying drawings, in which FIG. 12 shows an apparatus according to a second embodiment as a simplified diagram in a first operating state, FIG. 13 shows an apparatus according to a second embodiment as a simplified diagram in a first operating state, FIG. 14 shows an apparatus according to a second embodiment as a simplified diagram in a second operating state, with a transferring member of a press device in a first position.

DETAILED DESCRIPTION OF THE INVENTION

In some cases the features presented in this application may be used as such, disregarding other features. On the other hand, the features presented in this application may be combined, if necessary, to form different combinations.

The features presented in the following paragraphs in combination with other features may also be used separately, if necessary.

Some embodiments are illustrated in FIG. 1-16.

An embodiment of a pneumatic material conveying system may be, according to the one embodiment, a waste material or recyclable material collection and conveying system. In a pneumatic material conveying system material may be conveyed from an input point in a material conveying pipe 100 by means of a pressure difference in a transporting air flow to an output end of the material conveying system. At the output end, the transported material may be separated from the transporting air flow in a separator device 1. The separator device may be for example a separator container. The pressure difference and the transporting air flow needed for transporting material w may be provided for example by a partial-vacuum generator 8, a suction side of which may be connected to act in the material conveying pipe 100. At the same time, replacement air may be conducted to the material conveying pipe.

Figures 1, 2:
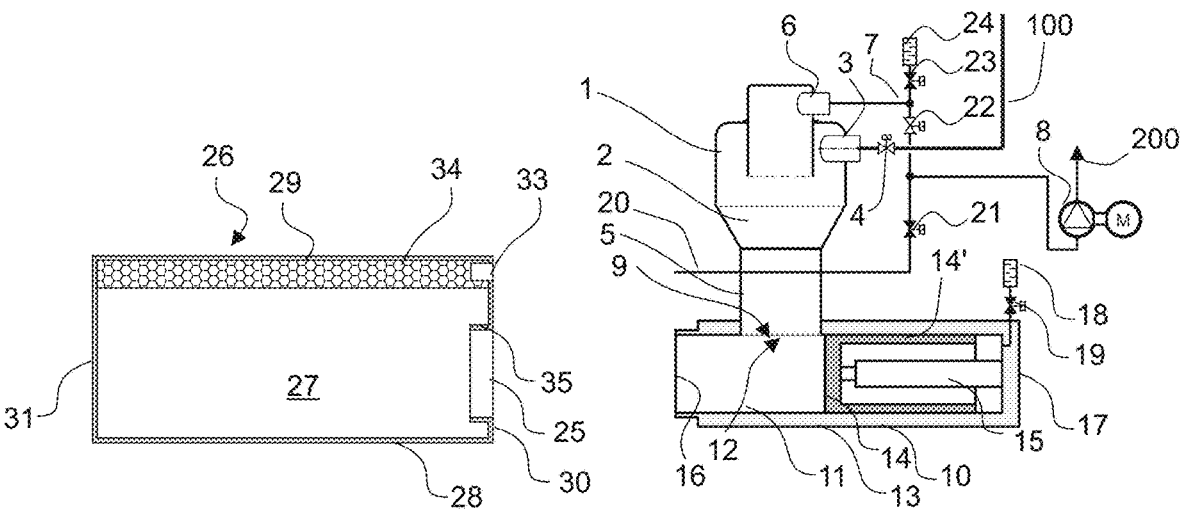
FIG. 1 shows a part of an apparatus according to one embodiment as a simplified diagram seen from the side, partly cut with a material container removed.
FIG. 2 shows a material container of an apparatus according to one embodiment as a simplified diagram cut in a longitudinal vertical plane.

One embodiment of the solution according to the invention is shown in FIG. 1, in which in connection with the separator device 1 of a pneumatic material conveying system, for example a waste conveying system, there is a press device 10 having a transferring member 14 arranged to be moved in a press chamber 11 and an operating apparatus 15 thereof. The separator device 1 may comprise a container part 2 to which an inlet pipe 3 may be connected. The inlet pipe 3 may be connected to the material conveying pipe 100 of the material conveying system. The material conveying pipe 100 may be connectable to material input points (not illustrated). Material W, such as solid household waste or recyclable material, is fed, for example at an input point, to the material conveying pipe 100 in which it is conveyed by means of suction/pressure difference and/or transporting air flowing in the piping to the container part 2 of the separator device 1 from the inlet pipe 3. In the container part 2 of the separator device 1, the material is separated from transporting air, for example by means of gravity and/or centrifugal force, such that the conveyed material W moves to a lower part 5 of the separator device 1. An outlet pipe 6 may be arranged in an upper part of the separator device 1, which outlet pipe may be connected by a pipeline 7 to a suction side of a partial-vacuum generator 8, such as a suction pump or a blower. The transporting air may exit from the container part 2 of the separator device to the outlet pipe 6.

According to one embodiment, the container part 2 of the separator device 1 may comprise a portion tapering conically towards the lower part 5. In the embodiment of FIG. 1, a cylindrical portion may be arranged in the lower part 5 of the container part 2 of the separator device after the conical portion, the cylindrical portion having a material outlet opening 9 in a lower part thereof. Material may be removed from the container part 2 of the separator device 1 via the outlet opening 9 formed in the lower part 5 thereof. The separator device 1 may also be of another shape and work on a different operating principle. According to one embodiment, the separator device 1 is arranged in a vertical direction over the press chamber 11 of the press device 10, whereby the separated material w may easily move via the outlet opening 6 of the separator device to the press chamber 11.

The lower part of the separator device 1 may be arranged to a wall 13 of the press chamber 11 of the press device 10, for example to an upper part of the wall. The outlet opening 6 of the separator device 1 may be connected to an inlet opening 12 of the press chamber 11 of the press device 10. The inlet opening 12 of the press chamber 11 of the press device 10 may be arranged aligned with the outlet opening 9 of the separator device 1. The outlet opening 6 of the separator device may be, according to one embodiment, arranged to the lower part of the separator device. The inlet opening 12 of the press chamber 11 of the press device 10 may be arranged to the upper part of the wall 13 of the press chamber. According to one embodiment, the wall 13 of the press chamber may have an upper wall portion, a first side wall portion, a second side wall portion, at a distance from the first side wall portion and a lower wall portion at a distance from the upper wall portion. The lower wall portion may connect the first side wall portion and the second side wall portion from their lower part. The upper wall portion may connect the first side wall portion and the second side wall portion from their upper part. A transferring member 14 may be arranged in a movable manner in the press chamber 11. The transferring member 14 may comprise a transferring member front surface, which may work as a pressing surface for transferring and pressing the material w when the material w is transferred by the transferring member from the press chamber 11 to a container space 27 of a material container 26. An actuator 15 may be arranged to move the transferring member 14. According to one embodiment, the actuator 15 may be a cylinder-piston combination, for example a medium-operated cylinder-piston combination, such as a hydraulically-operated actuator or a pneumatic actuator. According to one embodiment, the actuator 15 may be a mechanical or an electro-mechanical actuator. The press chamber 11 may comprise an outlet opening 16. The outlet opening 16 may be arranged to a first end of the press chamber 11. The outlet opening 16 may be arranged to a distance from the inlet opening 12 of the press chamber. According to one embodiment, the outlet opening 16 may be arranged to a distance from the inlet opening 12 in a transferring direction of the transferring member 14. According to one embodiment, a material removing direction of the separator device 1 may be transverse to the longitudinal axis of the press chamber 11. According to one embodiment, the longitudinal axis of the press chamber 11 may be parallel to a principal moving direction of the transferring member 14. According to one embodiment, the separator device 1 material w removing direction via the outlet opening 9 may according to one embodiment be parallel to the vertical axis of the separator device. According to one embodiment, material is supplied into the separator device 1 from the upper part and removed to the press chamber 11 from the lower part of the separator device 1. According to one embodiment, the separator device 1 may be a cyclone separator, i.e. a vortex separator, into which the material is supplied via the inlet pipe 3 together with transporting air. According to one embodiment, the transporting air may exit from the separator device 1 to the outlet pipe 6. According to a second embodiment, the separator device 1 may comprise a line for conducting replacement air via the separator device to the press chamber 11. According to one embodiment, a connection for replacement air may be arranged from the outlet pipe 6 of the separator device. According to one embodiment, a replacement air inlet opening 24 is provided, from which there is a connection into the separator device 1, to the container space 2 thereof. According to one embodiment, from the replacement air inlet opening 24 there is a line for replacement air equipped with a closing and regulating device, such as a valve 23, to the container space 2 of the separator device 1. According to a second embodiment, replacement air may be conducted to the container space 2 of the separator device via the material conveying pipe 100 and the inlet pipe 3.

The transferring member 14 of the press device may be arranged movable in a principal moving direction thereof between at least a first position and a second position. In the first position, i.e. initial position, the transferring member 14 may be arranged in the press chamber 11 to an opposite end relative to the outlet opening 16 thereof and on an opposite side of the inlet opening 12. In the second position, the transferring member 14 may be arranged to extend to the outlet opening 16 of the press chamber or to the vicinity thereof.

In connection to the separator device 1, between the material outlet opening 6 of the container part 2 of the separator device 1 and an input opening 25 of a separate material container 26, a press chamber 11 having an input opening 12 may be arranged. The input opening 12 may be arranged aligned with the outlet opening 6 of the container part 2 of the separator device 1. The press chamber 11 has an outlet opening 16 arrangeable aligned with the input opening 25 of the separate material container 26. The press chamber 11 may be arranged to be connected to the lower part 5 of the container part 2 of the separator device by a collar part.

According to one embodiment, a transferring member 14 may be arranged movable between at least two positions in the press chamber 11. The transferring member 14 may be arranged to transfer the waste material w, which is conducted from the input opening 9 to the press chamber 11, towards the outlet opening 16 thereof and further to the separate material container 26 from the input opening 25 or at least to the vicinity of the input opening 25. The transferring member may be arranged, in connection with transferring, to also simultaneously press denser the material being transferred, i.e. to compact material to the separate material container 26. According to one embodiment, the material container 26 may be a movable container, for example one that may be taken on a transportation medium, such as a transportation vehicle. According to one embodiment, the material container comprises a bottom 28 and an upper wall 29 at a distance therefrom. From a first side edge of the bottom extending towards the upper wall is a first side wall 32 and at a distance from the first side wall, from a second edge of the bottom, a second side wall 32'. The bottom part connects the first side wall and the second side wall from their lower parts. The side walls 32, 32' connect the bottom 28 to the upper wall 29. The material container 26 may comprise a first end wall 30. The first end wall may connect the bottom 28 and the upper wall 29 as well as the first side wall 32 and the second side wall 32'. According to one embodiment, the material container comprises a second end wall 31. The second end wall may be arranged to a distance from the first end wall 30. The second end wall 31 may connect the bottom 28, the upper wall 29, the first side wall 32 and the second side wall 32'. According to one embodiment, the first end wall 30 may comprise an input opening 25 arranged to the end wall. A frame 35 may be arranged to the edge of the input opening 25. According to one embodiment, the frame 35 of the input opening 25 of the material container 26 may be configured to connect to a counterpart surrounding the outlet opening 16 of the wall 13 of the press chamber 11 of the press device 10. Thus, material may move from the press chamber 11 to the container space 27 of the material container 26, when the material container is connected to the press chamber of the press device such that material may move from the press chamber via the outlet opening 16 from the input opening 25 of the material container to the container space 27.

Figure 3:
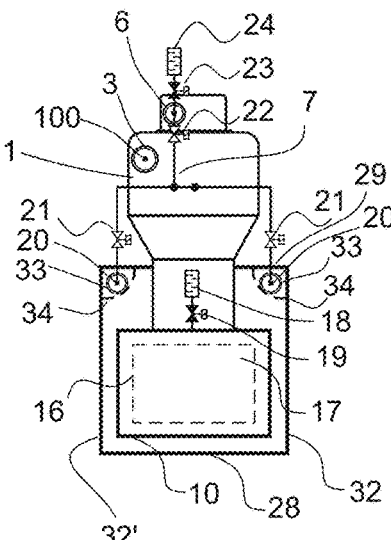
FIG. 3 shows an apparatus according to one embodiment as a simplified diagram seen from the end, from the direction of arrow A of FIG. 4.

A suction opening 33 may have been arranged to an upper part of the material container 26, to which suction opening a pipe 20 leading to the suction side of a partial-vacuum generator may be connected. According to one embodiment, the suction opening 33 is arranged to an upper part of the first end wall 30. According to one embodiment, there may be several suction openings 33. In the embodiment of FIG. 3, there are two suction openings 33. According to one embodiment, two branches are formed from the pipe 20 leading to the suction side of the partial-vacuum generator 8, each of which may be connectable to one of the suction openings 33 of the material container 26. An air-permeable separator wall 34, for example a mesh or a grille, may be arranged to the upper part of the material container 26. The separator wall 34 may allow air to pass through but separates material, for example at least the large particles, carried along in the air, such that the material w remains in the container space 27 of the material container 26.

According to one embodiment, the suction arranged via the suction opening 33 of the material container 26 may be utilized in connection with the press apparatus 10 to increase the efficiency of movement of the material w from the separator device 1 to the press chamber 11. The pressure difference and/or transporting air flow provided for example by the suction side of the partial-vacuum generator, acting in the container space via the suction opening 33 and thereby in the press chamber 11 via the input opening and the outlet opening of the press chamber, may be used to transfer material in addition to or instead of gravity to the press chamber and from the press chamber further towards the outlet opening of the press chamber, towards the input opening 25 of the material container and the container space 27 of the material container.

By one embodiment, the suction and its effect may be regulated by closing/regulating means, such as valves, the opening and closing of which valves may be controlled, for example by actuators arranged in connection with the valves. Additionally, a replacement air inlet path to the separator device 1, for example to the container space 2 thereof, may be opened/closed.

A separate replacement air inlet opening may be arranged in the embodiments of FIG. 1-8, whereby a connection to the replacement air inlet opening 24 may be opened/closed by a valve member 23. According to one embodiment, the replacement air inlet opening 24 or for example inlet channel may be arranged to the wall of the separator device. According to one embodiment, the replacement air inlet opening may be connected to the upper part of the container space of the separator device. In the embodiment of FIG. 1-8, the replacement air inlet opening may be configured to be connected to a pipe 7. A valve member 22 may be arranged to the pipe 7, by which valve member a connection to the suction side of the partial-vacuum generator 8 may be opened/closed. According to one embodiment, the valve member 22 may be arranged to the pipe 7 along a portion between the connection of the replacement air suction opening 24 and the suction side of the partial-vacuum generator 8. Thereby the connection to the suction side of the partial-vacuum generator 8 may be closed and the replacement air valve 23 opened for conducting replacement air to the container space 2 of the separator device. A connection may be provided from the suction side of the partial-vacuum generator 8 to the suction pipe 20. The suction pipe 20 may be connected to the suction opening 33 of the material container 26. According to one embodiment, the connection from the suction side of the partial-vacuum generator 8 to the suction opening 33 of the material container 26 may be openable/closable by a valve member 21 arranged to the suction pipe 20. According to one embodiment, the suction impact site in the container space 27 of the material container 26 may be varied by the valve members 21, and thus the material w moving direction in the container space may possibly be controlled by means of the suction. According to one embodiment, there may be several material containers 26, whereby the valve member 21 may be used for opening/closing a connection between the container space 27 of each material container 26 and the suction side of the partial-vacuum generator 8.

Next the operation of some embodiments will be explained with reference to the figures. In the figures, the state of the closing/regulating members is illustrated schematically. The state may be expressed by the colour of the closing/regulating members. For example, a black closing/regulating member symbol may indicate a state where a connection through the closing/regulating member is closed in the pipe or channel to which the closing/regulating member is arranged. A white symbol, i.e. a symbol with no black filling, may indicate a state of the closing/regulating member in which a connection through the regulating member in the pipe to which the closing/regulating member is arranged is open. In the figures the material and/or air flow directions are also indicated by arrows. The material w is illustrated in the figures in a simplified form as balls. According to one embodiment, the material w may be waste or recyclable material. According to one embodiment, the material w may be material packed into bags, for example solid waste material or recyclable material. Depending on the application the material may be sorted material or mixed material comprising different material types, such as mixed waste.

Figure 4:
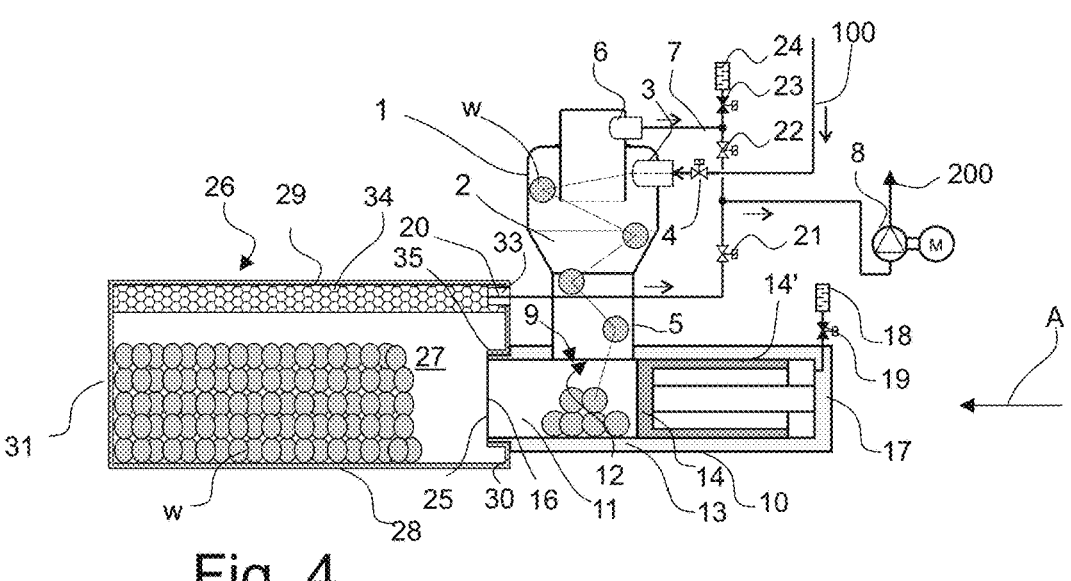
FIG. 4 shows an apparatus according to one embodiment as a simplified diagram in a first operating state.
Figure 5:
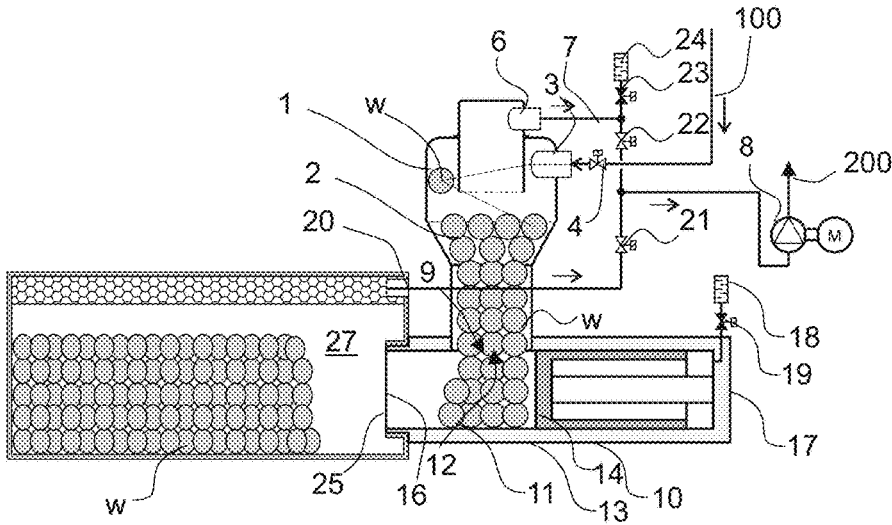
FIG. 5 shows an apparatus according to one embodiment as a simplified diagram in a first operating state.

In FIG. 4 the material container 26 is removably connected to the press device. Thus, the material W may be transferred via the outlet opening 16 of the press chamber 11 from the press chamber via the input opening 25 of the material container 26 to the container space 27. The material W is transported in the conveying pipe 100 in a transporting air flow by means of a pressure difference to the container space of the separator device 1. Thereby the suction side of the partial-vacuum generator may be connected to act in the container space 2 of the separator device 1 via the pipe 7 and the outlet pipe 6 and further in the material conveying pipe 100 via the inlet pipe 3. Replacement air may be conducted to the material conveying pipe 100 from the opposite side of the conveyed material. Thus, the material w moves in a manner known per se in the material conveying pipe 100 of the partial-vacuum system into the separator device 1 in the transporting air flow due to the pressure difference. In the container space 2 of the separator device 1 the heavier material W may move to the lower part of the container space and the transporting air may exit via the outlet pipe 6 from the upper part of the separator device 1. The transporting air may be conducted further via the pipe 7 leading to the suction side of the partial-vacuum generator 8, and further to the blowing side of the partial-vacuum generator and via possible transporting air filtering means (not illustrated) to an outlet pipe 200, for example out. The material w may move from the separator device via the outlet opening 9 to the press chamber 11 via the input opening 12. The material w may accumulate, as more material is conducted via the conveying pipe 10 into the separator device, into a material accumulation. The material accumulation may extend from the press chamber 11 to the container space 2 of the separator device as illustrated in FIG. 5.

Figure 6:
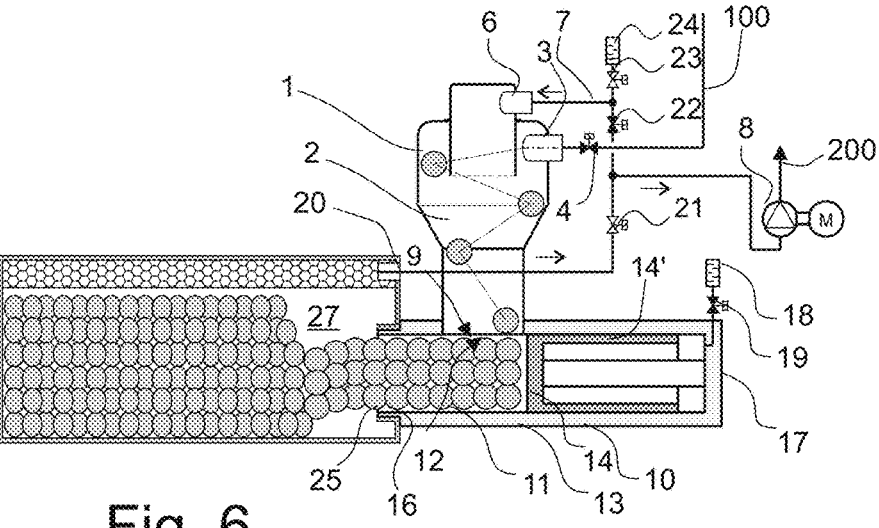
FIG. 6 shows an apparatus according to one embodiment as a simplified diagram in a second operating state, with a transferring member of a press device in a first position.

In the operating state of FIG. 6, a connection to the material conveying pipe 100 from the container space 2 of the separator device 1, for example from the inlet pipe 6, may be closed by a closing/regulating member 4, for example a valve. A connection from the container space 2 of the separator device 1 to the suction side of the partial-vacuum generator may be closed. A connection from the suction side of the partial-vacuum generator 8 to the suction opening 33 of the material container 26 may be formed by the suction pipe 20. The replacement air inlet opening 24 may be open for conducting replacement air to the container space of the separator device. According to one embodiment, replacement air has thereby access into the separator device 1, to the container space thereof, to the opposite side of the material w or possible material accumulation relative to the suction of the partial-vacuum generator 8 acting in the container space 27 of the material container 26, such that the material w may move due to the pressure difference from the press chamber 11 further to the container space of the material container 26. This may considerably increase the efficiency of movement of the material from the container space 2 of the separator device 1 via the press chamber 11 to the container space 27 of the material container 26, compared to a situation where material is transferred by means of gravity alone from the separator device 1 via the outlet opening 9 to the press chamber 11.

Figure 7:
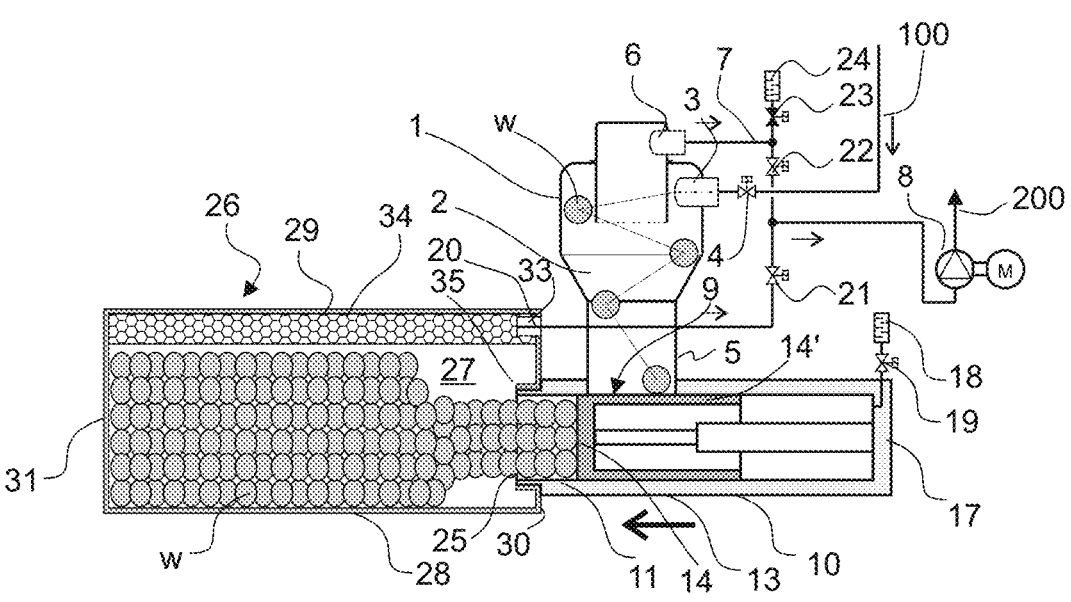
FIG. 7 shows an apparatus according to one embodiment as a simplified diagram in a third operating state, with a transferring member of a press device in an intermediate position.
Figure 8:
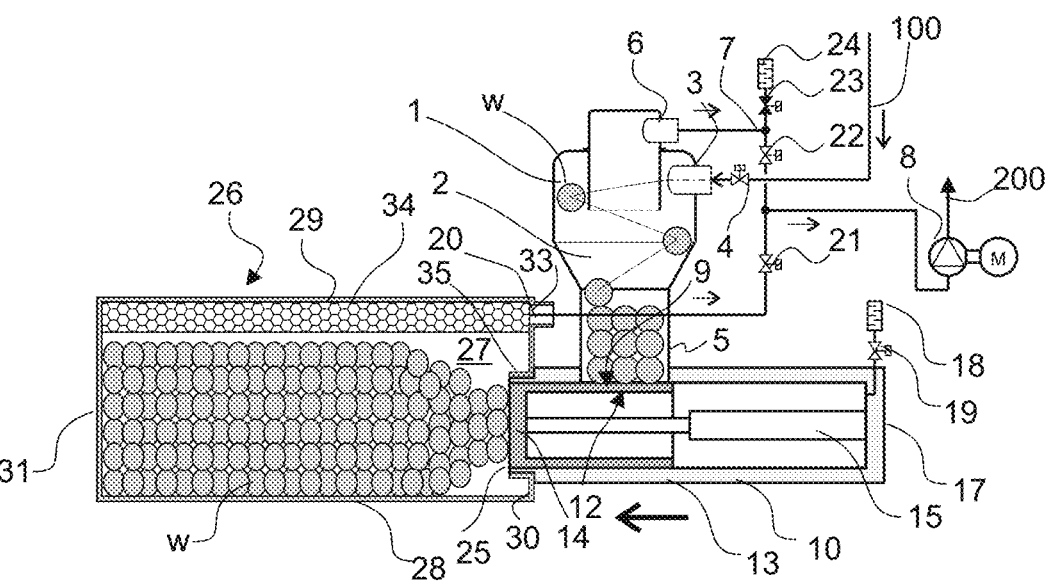
FIG. 8 shows an apparatus according to one embodiment as a simplified diagram in a third operating state, with a transferring member of a press device in a second position.
Figures 9, 10:
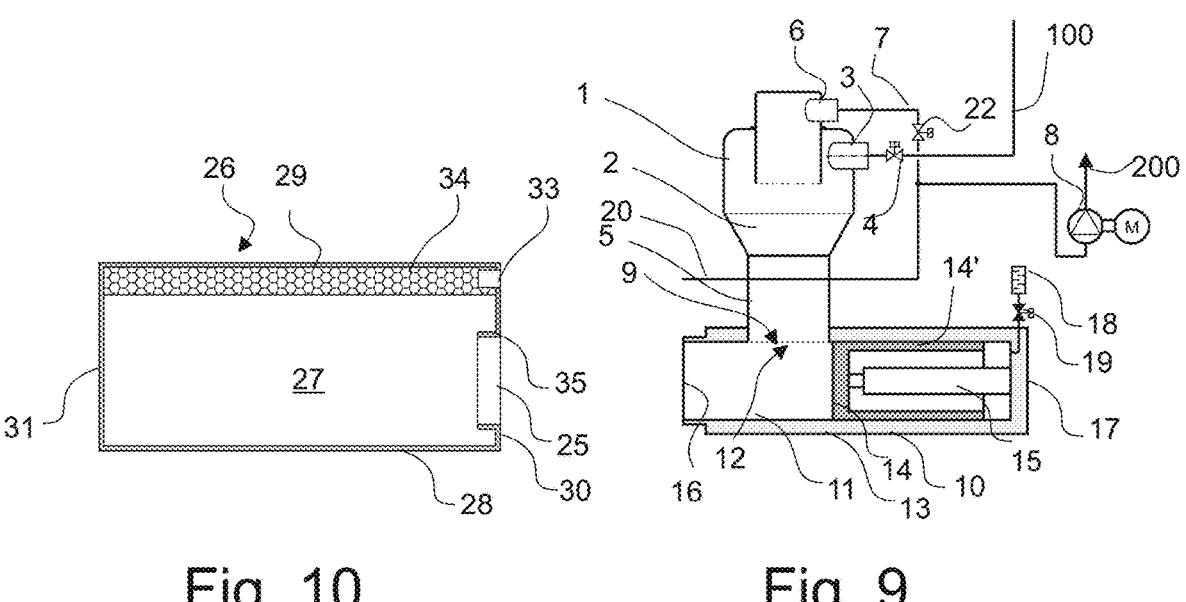
FIG. 9 shows a part of an apparatus according to a second embodiment as a simplified diagram seen from the side, partly cut with a material container removed.
FIG. 10 shows a material container of an apparatus according to a second embodiment as a simplified diagram cut in a longitudinal vertical plane.
Figure 11:
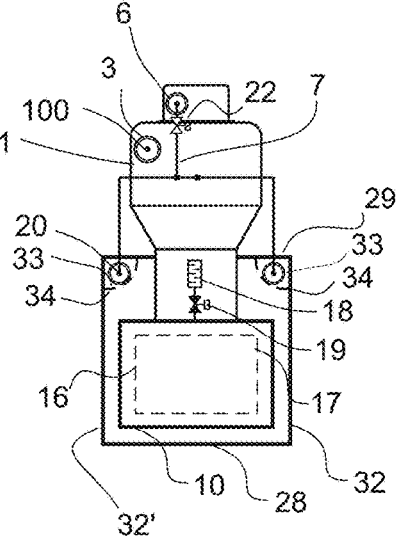
FIG. 11 shows an apparatus according to a second embodiment as a simplified diagram seen from the end, from the direction of arrow A of FIG. 12.

In the operating state of FIG. 7, the transferring member 14 of the press device is illustrated in an intermediate position, i.e. in the process of moving by means of the actuator 15 in the press chamber 11 from a first position towards a second position. In FIG. 4-6 the transferring member 14 of the press device is in the first position. In FIG. 8 the transferring member 14 of the press device is in the second position. In the operating state of FIG. 7, the transferring member 14 of the press device transfers and compacts the material w, having moved to the press chamber, to the outlet opening 16 of the press chamber and further to the container space 27 of the material container 26. As suction acts in the container space 27, more material w may be caused to move to the press chamber 11 to the operating range of the transferring member 14 of the press device than as a result of movement of the material by gravity alone. Due to the suction acting from the container space 27 and the replacement air under ambient pressure acting from the opposite side of the material, material may move due to the pressure difference as shown for example in FIG. 6. Thus, the capacity of the press device may be significantly increased by means of the suction acting via the container space 27 of the material container. The pressing stroke frequency of the transferring member 14 of the press device 10 does not need to be increased, when the pressure difference provided by the combination of suction and replacement air may be used for transferring the material w from the separator device 1 to the press chamber 11. As a result of movement of the material by gravity alone, the pressing stroke frequency of the press device would have to be increased in order to provide a corresponding capacity for the press device. According to one embodiment, this is for example because more material can be conducted to the operating range of the transferring member 14 of the press device by means of the suction acting from the direction of the container space 27 than without the suction by means of gravity alone.

In the operating state of FIG. 7 and FIG. 8, a replacement air opening 18 in the frame of the press device may be open to the press chamber 11. According to one embodiment, the replacement air opening 18 is arranged to the wall of the press chamber 11 of the press device, to a first end 17 thereof. A closing/regulating means, such as a valve 19, may be arranged in connection with the replacement air opening 18. The transferring member 14 may comprise support walls configured to be supported to the walls of the press chamber. According to one embodiment, the transferring member may comprise a support wall transverse to and extending from the pressing surface. According to one embodiment, the support wall may extend from the pressing surface of the transferring member 14 towards the first end 17 of the pressing chamber of the press device. According to one embodiment, the press device 10 may comprise a closing part 14' by which a connection between the container space 2 of the separator device and the press chamber 11 may be openable and closable. According to one embodiment, the connection may be openable and closable synchronously to the movements of the transferring member 14. According to one embodiment, the closing part 14' may be the support wall of the transferring member 14, which may be configured to close the connection from the separator device to the press chamber, when the transferring member is transferred from the first position to the second position. Thus, more material w may be conducted into the separator device simultaneously as the transferring member of the press device performs a pressing stage, i.e. moves from the first position to the second position. After the pressing stage has been performed, the transferring member of the press device may be returned from the position of FIG. 8 by the actuator 15 back to the first position illustrated in FIG. 4.

A second embodiment is illustrated in FIG. 9-16. It differs from the embodiment of FIG. 1-8 in that the replacement air may be configured to be supplied to the container space of the separator device via the material conveying pipe 100. Thereby a separate replacement air opening is not needed in the separator device. The arrangement according to the second embodiment also enables the material w to be conveyed from the conveying pipe 100 continuously into the separator device, without the connection from the separator device 1 to the material conveying pipe 100 having to be closed. In the embodiment of FIG. 9-16 the suction of the partial-vacuum generator 8 may be connected to act in the transporting air outlet pipe 6 of the separator device via the pipe 7. The connection between the suction side of the partial-vacuum generator 8 and the transporting air outlet pipe in the pipe 7 may be opened and closed by a closing/regulating means, such as a valve 22. The suction side of the partial-vacuum generator 8 may be connected to act in the material conveying pipe 100 via the transporting air outlet pipe 6, the container space 2 and the material inlet pipe 3 of the separator device 1 for conveying the material w along the material conveying pipe 100 to the container space 2 of the separator device. The suction side of the partial-vacuum generator 8 may be connected to act in the suction pipe 20, which may be removably connected to the suction opening of the material container 26. According to one embodiment, the connection from the suction side of the partial-vacuum generator to the suction pipe may be opened/closed by a closing/regulating means, such as the valve 21 illustrated in FIG. 1-8. According to one embodiment, the connection from the suction side of the partial-vacuum generator 8 via the suction pipe 20 to the suction opening 33 and to the container space of the material container 26 may be open, as for example in the embodiments of FIG. 9-16. The suction side of the partial-vacuum generator 8 may be simultaneously connected to both of the container space of the separator device and the container space 27 of the material container 26 or to only one of them, either to the container space 2 of the separator device 1 or to the container space 27 of the material container 26.

The material container 26 may be removably connected to the press device for bringing the outlet opening 16 of the press chamber 11 of the press device 10 to alignment with the input opening 25 of the material container 26, whereby the material w may be transferred from the press chamber 11 to the container space 27 of the material container 26.

In FIG. 12, the material container 26 is removably connected to the press device. Thus, the material W may be transferred via the outlet opening 16 of the pressing chamber 11 from the press chamber via the input opening 25 of the material container 26 to the container space 27. The material W is transported in the conveying pipe 100 in a transporting air flow by means of a pressure difference to the container space of the separator device 1. Thereby the suction side of the partial-vacuum generator may be connected to act in the container space 2 of the separator device 1 via the pipe 7 and the outlet pipe 6 and further in the material conveying pipe 100 via the inlet pipe 3. Replacement air may be conducted to the material conveying pipe 100 from the opposite side of the conveyed material. Thus, the material w moves in a manner known per se in the material conveying pipe 100 of the partial-vacuum system into the separator device 1 in the transporting air flow due to the pressure difference. In the container space 2 of the separator device 1 the heavier material w may move to the lower part of the container space and the transporting air may exit via the outlet pipe 6 from the upper part of the separator device 1. The transporting air may be conducted further via the pipe 7 leading to the suction side of the partial-vacuum generator 8, and further to the blowing side of the partial-vacuum generator and via possible transporting air filtering means (not illustrated) to an outlet pipe 200, for example out. The material w may move from the separator device via the outlet opening 9 to the press chamber 11 via the input opening 12. The material w may accumulate, as more material is conducted via the conveying pipe 10 into the separator device, into a material accumulation. The material accumulation may extend from the press chamber 11 to the container space 2 of the separator device as illustrated in FIG. 13. In the operating states of FIG. 12-14, a connection to the material conveying pipe 100 from the container space 2 of the separator device 1, for example from the inlet pipe 3, may be open. A connection from the container space 2 of the separator device 1 to the suction side of the partial-vacuum generator via the transporting air outlet pipe may be open, when material is conveyed mainly from the conveying pipe into the separator device. A connection may be formed from the suction side of the partial-vacuum generator 8 to the suction opening 33 of the material container 26 by the suction pipe 20. Replacement air may be conducted via the material conveying pipe 100 for conducting replacement air to the container space of the separator device. According to one embodiment, replacement air has thereby access into the separator device 1, to the container space thereof, to the opposite side of the material w or possible material accumulation relative to the suction of the partial-vacuum generator 8 acting in the container space 27 of the material container 26, such that the material w may move due to the pressure difference from the press chamber 11 further to the container space of the material container 26. This may considerably increase the efficiency of movement of the material from the container space 2 of the separator device 1 via the press chamber 11 to the container space 27 of the material container 26, compared to a situation where material is transferred by means of gravity alone from the separator device 1 via the outlet opening 9 to the press chamber 11.

In order to increase the efficiency of movement of the material from the press chamber 11 to the container space 27 of the material container, the connection via the transporting air outlet pipe 6 of the separator device to the suction side of the partial-vacuum generator 8 may be closed, for example by a closing/regulating means, such as a valve 22. This is illustrated in FIG. 14. Thus, as the connection via the suction opening 33 of the material container 26 and the suction pipe 20 to the suction side of the partial-vacuum generator is maintained, the suction effect is efficiently exerted on the material w supplied via the press chamber 11. At the same time, replacement air may flow via the material conveying pipe 100 to the inlet pipe 6 and further to the container space 2 of the separator device 1 and via the outlet opening 9 of the separator device and the input opening 12 of the press device to the opposite side of the material w being in the press chamber 11 relative to the suction acting in the container space 27. Due to the generated pressure difference, the material w may move efficiently from the press chamber 11 to the container space 27 via the outlet opening 16 and the inlet opening 25.

Figure 15:
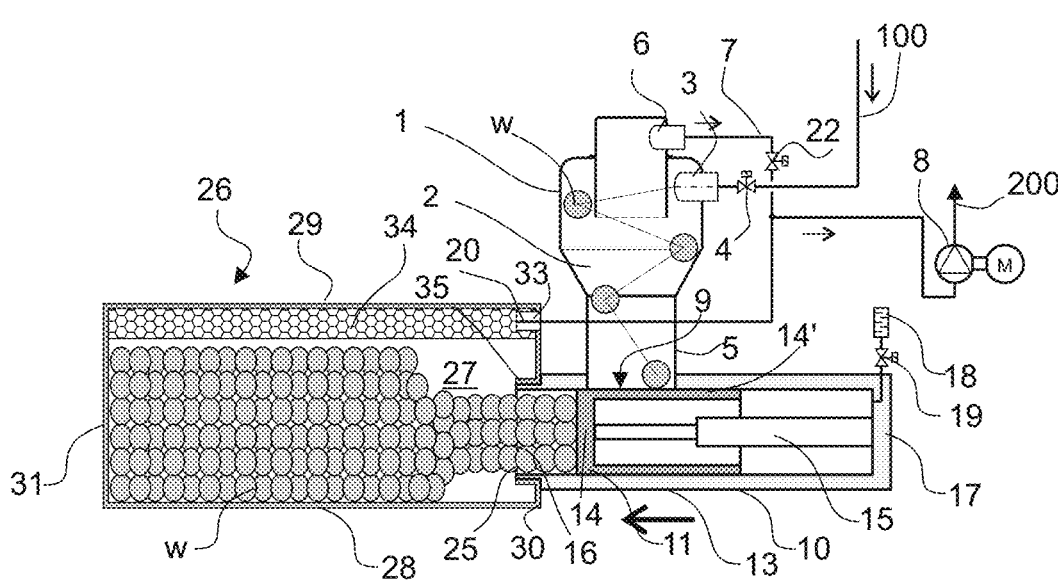
FIG. 15 shows an apparatus according to a second embodiment as a simplified diagram in a third operating state, with a transferring member of a press device in an intermediate position.
Figure 16:
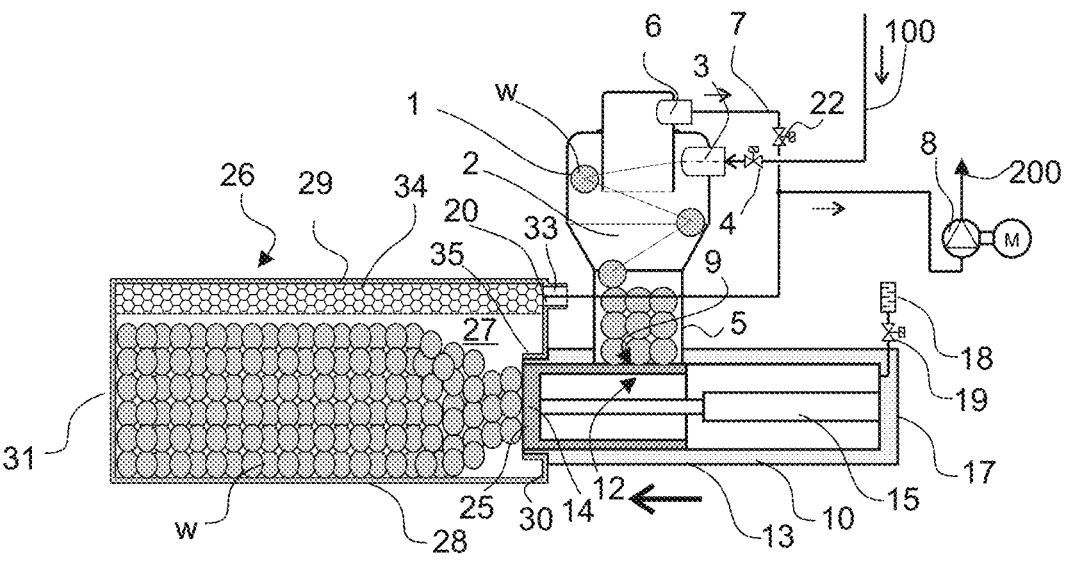
FIG. 16 shows an apparatus according to a second embodiment as a simplified diagram in a third operating state, with a transferring member of a press device in a second position.

In the operating state of FIG. 15, the transferring member 14 of the press device is illustrated in an intermediate position, i.e. in the process of moving by means of the actuator 15 in the press chamber 11 from a first position towards a second position. In FIG. 12-14, the transferring member 14 of the press device is in the first position. In FIG. 16, the transferring member 14 of the press device is in the second position. In the operating state of FIG. 15 the transferring member 14 of the press device transfers and compacts the material w, having moved to the press chamber, to the outlet opening 26 of the press chamber and further to the container space 27 of the material container 27. As suction acts in the container space 11, more material w may be caused to move to the press chamber to the operating range of the transferring member 16 of the press device than as a result of movement of the material by gravity alone. Due to the suction acting from the container space 27 and the replacement air under ambient pressure acting from the opposite side of the material, material may move due to the pressure difference, as shown for example in FIG. 14. Thus, the capacity of the press device may be caused to be significantly increased by means of the suction acting via the container space 27 of the material container. The pressing stroke frequency of the transferring member 14 of the press device 10 does not need to be increased, when the pressure difference provided by the combination of suction and replacement air may be used for transferring the material w from the separator device 1 to the press chamber 11. As a result of movement of the material by gravity alone, the pressing stroke frequency of the press device would have to be increased in order to provide a corresponding capacity for the press device. According to one embodiment, this is for example because more material can be conducted to the operating range of the transferring member 14 of the press device by means of the suction acting from the direction of the container space 27 than without the suction by means of gravity alone.

In the operating state of FIG. 15 and FIG. 16, the replacement air opening 18 in the frame of the press device may be open to the press chamber 11. According to one embodiment, the replacement air opening 18 is arranged to the wall of the press chamber 11 of the press device, to a first end 17 thereof. A closing/regulating means, such as a valve, may be arranged in connection with the replacement air opening 18. The transferring member 14 may comprise support walls configured to be supported to the walls of the press chamber. According to one embodiment, the transferring member may comprise a support wall transverse to and extending from the pressing surface. According to one embodiment, the support wall may extend from the pressing surface of the transferring member 14 towards the first end 17 of the pressing chamber of the press device. According to one embodiment, the closing part 14' of the transferring member may be the support wall, which may be configured to close the connection from the separator device to the press chamber, when the transferring member 14 is transferred from the first position to the second position. Thus, more material w may be conducted into the separator device simultaneously as the transferring member of the press device performs a pressing stage, i.e. moves from the first position to the second position. After the pressing stage has been performed, the transferring member of the press device may be returned from the position of FIG. 16 by the actuator 15 back to the first position illustrated in FIG. 12.

In the application, a pipe may refer in general to a material, liquid or gas line. The pipe may be a rigid pipe, a flexible pipe, a hose or the like. The pipe may be formed of several pipe sections. A closing/regulating means, such as a valve member, may comprise several components. The valve member may comprise valve member operating means. The valve member operating means may be controlled by control means. The control means may control the valve members to open and/or close upon fulfilment of predetermined conditions automatically or manually. According to one embodiment, the valve members may be controlled individually or in groups. According to one embodiment, the valve members may be controlled for example on the basis of the amount of material, pressure or time or by an impulse provided by a user. The replacement air opening may also be a replacement air channel. A closing/regulating means, such as a valve member, may have been arranged in connection with the replacement air opening or replacement air channel for opening and/or closing the replacement air opening or replacement air channel.

The invention claimed is:
1. A method for transferring and handling material, the method comprising:

supplying material into a separator device by a material conveying pipe from an inlet opening together with a transporting air flow provided by a partial-vacuum generator connected by a pipe to a container space of the separator device, to a transporting air outlet pipe of the separator device;

removing the material is removed from a container space of the separator device via an outlet opening to a press chamber;

transferring and compacting the material by a transferring member of a pressing device via an outlet opening of a press chamber to a container space of a separate material container that is removably connected to the pressing device, wherein efficiency of movement of the material from the container space of the separator device to the press chamber and further to the container space of the material container is increased by connecting a suction side of the partial-vacuum generator to act in the container space of the material container via a suction pipe and a suction opening of the removable material container and by supplying replacement air to one or more of the container space of the separator device or to the press chamber of the press device via a connection between the suction pipe of the removable material container and the transporting air outlet pipe of the separator device.

2. The method according to claim 1, wherein the efficiency of movement of the material is increased by supplying replacement air to the container space of the separator device and simultaneously closing a connection via the transporting air outlet pipe of the separator device to the suction side of the partial-vacuum generator.

3. The method according to claim 1, wherein the efficiency of movement of the material is increased one or more of:

before a movement of the transferring member of the press device, for transferring and compacting the material from the press chamber to the container space of the material container, from a first position to a second position, or during the movement of the transferring member from the first position to the second position.

4. The method according to claim 1, wherein replacement air is supplied to the container space of the separator device via the material conveying pipe.

5. The method according to claim 1, wherein replacement air is supplied to the container space of the separator device via an inlet opening, when the connection via the transporting air outlet pipe of the separator device to the suction side of the partial-vacuum generator has been closed.

6. The method according to claim 1, further comprising:
transferring the material in a vertical direction from the container space of the separator device to the press chamber and in a transverse direction relative to the vertical direction in the press chamber and from the press chamber to the container space of the material container.

7. The method according to claim 1, further comprising:
using a material container removably connectable to the press device as the material container with the suction pipe is being removably connectable to the suction opening in an upper part of the material container.

8. An apparatus for transferring and handling material, the apparatus comprising a separator device having a material space, an inlet pipe, a transporting air outlet pipe, and a material outlet opening, to which inlet pipe a material conveying pipe is connectable for supplying material in a transporting air flow to a container space of the separator device, wherein the transporting air outlet pipe is connectable into medium communication with a suction side of a partial-vacuum generator of a pneumatic material conveying system, wherein the material outlet opening of the separator device is disposed in medium communication with a press chamber of a press device, the press chamber having an inlet opening, and an outlet opening, wherein the press chamber houses a movably arranged transferring member, and the transferring member of the press device is configured to transfer and compact material via the outlet opening of the press chamber to a container space of a separate material container removably connected to the press device, wherein the apparatus comprises means for increasing the an efficiency of movement of the material from the container space of the separator device to the press chamber and further to the container space of the material container, the means for increasing the efficiency of movement comprising connecting means for connecting the suction side of the partial-vacuum generator to act in the container space of the material container by a suction pipe via a suction opening of the removable material container and replacement air supplying means for supplying replacement air to one or more of the container space of the separator device or the press chamber of the press device via a connection between the suction pipe of the removable material container and the transporting air outlet pipe of the separator device.

9. The apparatus according to claim 8, wherein the replacement air supplying means comprise, from the material space of the separator device, one or more of:

a medium connection to a replacement air opening and closing/regulating means for opening and closing the medium connection; or an arrangement in which replacement air has been configured to be supplied to the container space of the separator device via one or more of the inlet pipe or the transporting air outlet pipe.

10. The apparatus according to claim 8, wherein the replacement air supplying means comprise a replacement air opening being in medium communication to the press device, to the pressing chamber thereof.

11. The apparatus according to claim 8, wherein the apparatus comprises first closing/regulating means configured to open a connection for supplying replacement air to the container space of the separator device and second closing/regulating means configured to close a connection from the container space of the separator device via the transporting air outlet opening to the suction side of the partial-vacuum generator.

12. The apparatus according to claim 8, wherein the apparatus has a first operating state in which the connection from the container space of the separator device via the transporting air outlet pipe to the suction side of the partial-vacuum generator is open and a connection from the inlet pipe of the separator device to the material conveying pipe is open, and from the suction opening of the material container via the suction pipe to the suction side of the partial-vacuum generator open, such that the material is able to move from the conveying pipe to the container space of the separator device and further via the outlet opening to the press chamber.

13. The apparatus according to claim 8, wherein the apparatus has a second operating state in which the connection from the container space of the separator device via the transporting air outlet pipe to the suction side of the partial-vacuum generator is closed and a replacement air line to an upper part of the separator device is open, and a connection via the suction opening of the material container and via the suction pipe to the suction side of the partial-vacuum generator is open, such that the material moves more efficiently from one or more of the container space of the separator device to the press chamber or the press chamber to the container space of the material container.

14. The apparatus according to claim 8, wherein the apparatus has a third operating state, in which the transferring member is configured to be transferred by an actuator from a first position to a second position, for transferring and compacting the material from the press chamber to the container space of the material container, in which operating state the connection via the suction opening of the material container and via the suction pipe to the suction side of the partial-vacuum generator is open, and a connection from the press chamber to a press replacement air opening is open, and the connection from the transporting air outlet pipe of the separator device to the suction side of the partial-vacuum generator is open.

15. The apparatus according to claim 8, wherein the apparatus has a fourth operating state in which the transferring member of the press device is configured to be moved from a second position to a first position, to a standby position.

16. The apparatus according to claim 8, wherein the press device comprises a closing part by which a connection between the container space of the separator device and the press chamber is openable and closable.

17. The apparatus according to claim 8, wherein the material container comprises a separator wall between the container space and the suction opening.

* * * * *